United States Patent

[11] 3,558,902

| [72] | Inventor | Everett R. Casey<br>5845 Old Orchard Trail, Orchard Lake Village, Mich. 48033 |
|---|---|---|
| [21] | Appl. No. | 699,490 |
| [22] | Filed | Jan. 22, 1968 |
| [45] | Patented | Jan. 26, 1971 |

[54] REMOTE CONTROL WIRING SYSTEM
42 Claims, 12 Drawing Figs.

[52] U.S. Cl. .................................................. 307/3,
307/114, 307/140, 340/310
[51] Int. Cl. ................................................. H04g 5/12
[50] Field of Search .......................................... 307/1120R,
114, 144, 3, 140; 317/147; 315/200, 291; 340/310,
171PPF; 323/22SCR

[56] References Cited
UNITED STATES PATENTS

| 2,524,300 | 10/1950 | Taylor | 340/171P.P.F. |
| 2,835,830 | 5/1958 | Rathenau | 307/114 |
| 3,054,994 | 9/1962 | Harm | 307/112OR |
| 3,119,047 | 1/1964 | Michalski | 317/147X |
| 3,264,634 | 8/1966 | Voigt | 317/147UX |
| 3,287,722 | 11/1966 | Craig | 317/147UX |
| 3,328,676 | 6/1967 | Slater | 323/22SCR |

Primary Examiner—Robert K. Schaefer
Assistant Examiner—T. B. Joike

ABSTRACT: A control system for use with a conventional residential-type wiring system for providing fully independent switching of any lighting or other load from local locations and from any selected remote location or locations, together with apparatus for facilitating such control.

REMOTE CONTROL WIRING SYSTEM

BACKGROUND OF THE INVENTION

Conventional residential-type wiring systems commonly include a three-wire power supply extending from the power transformer (or other building), and a plurality of branch circuits connected to the power supply line through fuses or circuit breakers. Most of the branch circuits usually comprise a plurality of wallbox-mounted convenience outlets (normally unswitched, but sometimes switched), and a plurality of switched lighting fixtures. The branch wiring is normally in the form of two-wire, insulated electric power cable (often, currently, with an auxiliary ground wire) extending to each unswitched convenience outlet box and to each wallbox-mounted wall switch, with another such cable extending from the switch wall box to the controlled fixture or outlet. The wall switch is commonly mounted in the same room (or at its entrance) as the controlled or switched fixture. In some cases a second switch controlling the same fixture (or outlet) is mounted in a wall box at a different location or at a different entrance to the same room, in which case the switches are of the "three-way" type (single pole, double throw) interconnected with three-conductor cable, to provide independency of control by the two switches.

Such systems have stood the test of time. The conductors, wall boxes and other elements are reasonably well standardized, and electrical contractors are well experienced in the ready and economic installation of these systems.

In recent years, remote control wiring systems have gained in popularity. Their primary advantage over conventional wiring systems lies in the feasibility of providing additional switches controlling selected fixtures from remote locations. For example, a master control panel in the master bedroom capable of controlling some or all of the lights in and around the house if often featured.

The commercial remote-control wiring systems usually comprise conventional branch-circuit wiring to the fixture boxes, a latching relay for each controlled fixture or outlet, and a plurality of on/off switches (local and remote) connected to the fixture relays by low-voltage wiring. The latching relay is sometimes mounted directly in the outlet box for the controlled fixture so as to control the connection of the fixture to electric-power conductors extending to that outlet box, with the low-voltage wiring being run from the local and remote switches to the relay. However, in view of the disadvantages of such a wiring mode, including the difficulty of subsequent alteration of the switch control, the recommended installation procedure entails running electric-power conductors from each load which is to be (or is ever to be) remotely controlled to a common switching point or relay center. Similarly, color-coded low-voltage wiring is run from that relay center to each local wall switch, which is associated with those loads, as well as from that relay center to the selected remote switching location. The various control equipment, including the relays, stepping motors, transformers and rectifiers, are then installed at the relay center.

Regardless of the wiring mode which is employed, the commercial remote-control wiring systems require, in significant part, wiring practices differing from those with which the majority of electrical contractors are well experienced, and a substantial amount of installation experience is required before the systems can be efficiently (and hence economically) installed. As a result, remote-control wiring systems have, in general, not met with widespread electrical-contractor enthusiastic acceptance.

In addition, while it is fully feasible, for a price, to establish as many remote-control locations as desired during the construction of the residence, office or other building, the subsequent addition of a later-desired remote-control switching location entails the problems of running additional wires (even though low voltage) through a completed building. By that same token, the conversion of an existing conventionally wired home to such a remote-control wiring system has but very limited feasibility.

SUMMARY OF THE INVENTION

In accordance with the principles of the present invention, the full functional equivalent of the noted remote-control wiring systems can be installed using, primarily, conventional residential-type wiring equipment, practices and techniques. If desired, the electrical contractor can simply be instructed to wire the building in accordance with his customary practices, subject only to the utilization of special "switches" in the installed conventional wall-switch boxes and to the subsequent addition of one or more remote-control units, which can be plugged into conventional convenience outlets by the homeowner. The full functional equivalency with current remote-control wiring systems includes the complete independency of the local and remote switches which control the same load, i.e., the load can be switched to either the on or the off state with either the local switch (or switches) or the remote switch (or switches) at any time.

In addition, the principles of the present invention permit the later addition of additional remotely located switches with no rewiring of the system.

Further, those principles permit the conversion of an existing, conventionally wired building to a remote-controlled wiring system without any changes in or additions to the existing wiring, the conversion simply entailing the replacement of the existing wall switches in the existing switch boxes in selected locations and the addition of one or more remote-control switching units at any selected remote location or locations, which can be installed, if desired, by simply plugging them into existing convenience outlets.

DESCRIPTION OF THE DRAWINGS

The manner of utilizing the principles of the inventions and its objects and features can best be understood from a consideration of the following detailed description of embodiments of the invention when read with reference to the accompanying drawings in which.

DESCRIPTION

In general, the remote-control system comprises a switch-controlled transmitter adapted for association with the building wiring at a selected location which can be remote from the controlled load or loads, and one or more switch-controlled receivers local to (usually within sight of) the controlled load or loads, and preferably mountable in switch boxes mounted in the walls of the building.

Figures 1, 2, 3, 4:
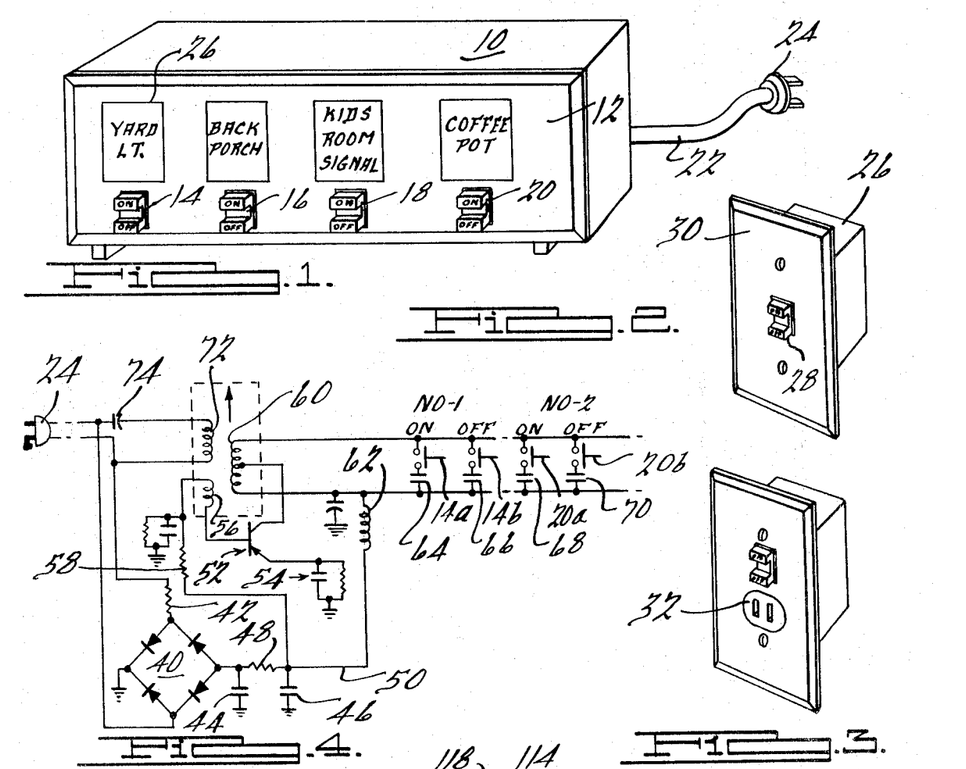
FIG. 1 is a perspective view of a remote controller embodying certain of the principles of the present invention.
FIG. 2 is a perspective view of a wall-box mountable local controller.
FIG. 3 is a perspective view of a wall-box mountable local controller and convenience outlet unit.
FIG. 4 is a schematic representation of a remote controlling or transmitter circuit which can be used in the unit of FIG. 1.

The transmitter may, for example, have the physical appearance of the unit illustrated in FIG. 1. That unit comprises a cabinet 10, of any suitable shape, size, appearance and material, having a face plate 12 bearing, representatively, a plurality of on/off switch actuators 14, 16, 18 and 20. The unit is associated with the wiring system of the building in any suitable fashion, as by means of a two-conductor cord 22 terminating in a plug 24 associable with a wall-box mounted convenience outlet.

Each of the switches 14 to 20 is illustrated to be of a commercially available type having a switch button or manually actuatable actuator which is spring biased to a neutral position, but which can be, in effect, rotated through an angle about a transverse axis in one sense by pressing along the illustrated upper portion of the button (labeled "on") and in an opposite sense by pressing on the illustrated lower portion of the button (labeled "off"). The switch is herein characterized as a "momentary" switch in that it does not latch, but releases upon the release of the applied pressure. Momentary pressure on the upper portion of the actuator, labeled "on," momentarily closes one pair of electrical contacts and momentary pressure on lower portion, labeled "off," momentarily operates another pair of electrical contacts. One contact may be common to both pairs of contacts in the illustrated circuit which is to be described. Upon the release of the pressure on either portion of the switch, the operated contacts release.

Each of the actuators 14 to 20 is individual to a remote load or group of remote loads. In the illustrated unit, labeling areas, such as area 26, are provided adjacent each actuator to permit identification of the controlled load or loads. Each of the identified load or loads can be controlled (switched on or off) from the remote location of the unit of FIG. 1. Momentary actuation of any selected one of the actuators 14 to 20 to either state (to either the "on" state or the "off" state) will either switch the identified load to that state (if it was in the opposite state) or insure that it is in the selected state (if it is already in the selected state, a fact which may not be known).

The illustrated unit is portable and can be readily removed from one location to another location for connection to a different convenience outlet. As many units such as the unit of FIG. 1 may be utilized in a single building as desired, controlling the same or different loads. A single transmitter unit may, of course, have fewer or more switches, and may also be permanently mounted, as in a wall, if desired.

Each load which is to be remotely controlled by the transmitter of FIG. 1 is controlled by a receiver unit associated with the same electrical power wiring system. In the illustrated arrangement, there should be an effective communication path between the two units at the alternating current frequencies at which the system operates.

In that which is herein denominated a conventional residential-type wiring system (which is of the type normally also utilized in offices, businesses, portions of factories and so forth, so that the term residential-type is used herein generically to all such utilizations), alternating current of the preselected frequency (normally 60 60 cycles per second in this country) is supplied to the building from the secondary winding of the distribution transformer via, usually, a three-wire cable. After suitable switching and fusing, the power is supplied to a plurality of effectively electrically interconnected branch circuits, each of which includes a pair of insulated wires or conductors extending to wall-box mounted outlets ("convenience outlets") as well as to various switched fixtures. The voltage difference between the conductors is normally in the range of 110 to 120 volts, AC. In normal practice, each fixture (such as a ceiling lighting fixture) is mounted in a recessed box and the switch which controls that fixture is also mounted in a box which is usually built into and recessed in the wall. The two electrical-power conductors (usually sheathed together to form a cable) which supply the electrical power to the subcircuit, are usually, in current practice, brought into a premounted, wall-mounted switch box, and another to two-conductor cable is run from that same box to the fixture box, for connection to the load. The two-conductor cables are customarily color coded white and black, with the white lead being characterized as the "ground" conductor and the black lead as the "hot" conductor. Normally, the two white conductors in the switch box are directly interconnected, and the line and load black conductors are connected to the two terminals of a single-pole, single-throw switch, so as to connect the switch in series with the controlled fixture. The switch is then mechanically secured in position in the wall box and a switch plate, apertured to permit the switch actuator to project therethrough, is secured to the switch to cover the wall box for aesthetic and safety purposes.

A representative receiver unit is illustrated in FIG. 2 of the drawings. It serves as a replacement or substitute for the cut customary wall switch. It is adapted to be mounted in a wall-mounted switch box and to be connected to the line and load electrical power conductors in that box, with the two "ground" leads being connected together and to the unit (or connected together by the unit) and with the two black or "hot" leads being separately connected to the unit. The connecting of the receiver unit to the two conductors in any branch circuit in the wiring system of the building establishes a communication path between the transmitter and the receiver.

The unit of FIG. 2 includes a housing or container 26 desirably of insulating material, a switch actuator 28, which can be identical to actuator 14 and the switch associated therewith, and a switch plate 30. The container 26 fits within the wall-mounted switch box and is securable therein in any suitable fashion. The container 26 and the switch plate 30 and the manner of associating one with the other and the container with the wall box can be quite similar to those used with solid-state light dimmer assemblies currently widely sold for use in substitution for wall switches.

Advantageously, the container 26 is small enough to be accepted by current standard single wall boxes both to facilitate standardization in new construction between the installation of a conventional wiring system and this remote-control wiring system, and to facilitate conversion of the wiring system in existing houses to this remote-control system. However, larger wall boxes can be employed if desired. While switch plate 30 may be conventional, housing 26 can be made deeper than usual, for convenience in packaging the circuitry, and the switch plate can be recessed from the rear so that it will protrude but still seal to the wall.

With a receiver unit, such as the unit of FIG. 2, mounted in a wall box local to a controlled load, the light (or other load) can be switched on or off by momentary actuation of the appropriate portion of switch 28. Momentary actuation of the switch 28 to the on position shifts the receiver unit to a stable state in which the two black conductors (from the line and to the load) are interconnected, so as to energize the load, and momentary actuation of the switch 28 to the off position shifts the receiver unit to a stable state in which those conductors are disconnected so as to deenergize the load. Independently of actuation of switch actuator 28, the receiver unit of FIG. 2 will respond to the on or off actuation of the proper one of the switch actuators at the transmitter of FIG. 1 to switch the load to the selected energized or deenergized state.

The modification of FIG. 3 illustrates that the load which is controlled by the local and by the remote switches need not be a wired-in fixture but can be a lamp or an appliance adapted to be plugged into a receptacle or outlet 32 mounted on the receiver unit itself.

The remote control system, in one form, can be installed by simply wiring the building conventionally except solely for the use of switching units such as those illustrated in FIGS. 2 or 3 (or the like) instead of conventional wall switches or convenience outlets at selected locations, and connecting one or more of the FIG. 1 transmitters to the wiring system.

Communication between the transmitter unit and the receiver unit and the is established by transmitting signals via the conventional building wiring. Those signals are at frequencies which are "high" relative to the line frequency (which is normally 60 cycles per second in this country). The signaling frequencies are advantageously in the range from about 30 kilocycles per second to several hundred kilocycles per second or higher (herein characterized as radiofrequency signals). The techniques of communicating intelligence via radiofrequency signals transmitted over wiring systems are well known and applicable, and accordingly the schematic representations of the circuits are intended to be but symbolic.

Figures 5, 6:
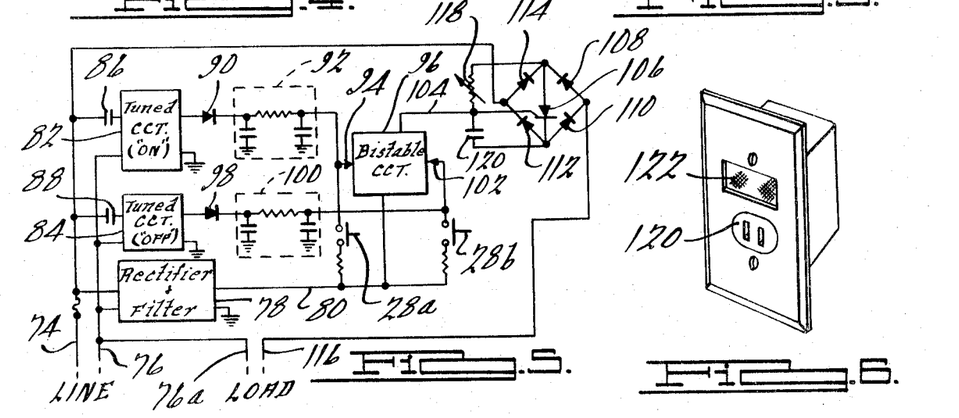
FIG. 5 is a schematic representation of a local controlling or receiver circuit which can be used in the unit of FIG. 2.
FIG. 6 is a perspective view of another wall-box mountable unit which can be utilized in conjunction with the transmitter unit of FIGS. 1 and 4.

A suitable circuit for use in the transmitter of FIG. 1 is shown in FIG. 4 and a suitable circuit for use in the receiver of FIG. 2 is shown in FIG. 5. In those circuits, signaling is illustratively accomplished by radiofrequency pulses normally of short but noncritical duration. Pulses of two different frequencies are utilized for each load (which term in intended to encompass a commonly controlled group of loads), one frequency being indicative of the "on" condition and the other, different, frequency being indicative of the "off" condition. Different pairs of frequencies are employed for the different loads (or groups of loads) which are to be differently controlled by other transmitter actuators. While single-frequency pulses are employed in the illustrated system, it will be appreciated that each signal may consist of two or more concurrently transmitted signals or of two or more time-spaced pulses, or of otherwise modulated relatively high-frequency energy in accordance with known signaling techniques. Such varients can provide increased selectivity and inter-system isolation.

The transmitter of FIG. 1 is associated with the residential-type wiring system by means of plug 24. A suitable local power supply is provided. In the illustrated arrangement, the alternating line current is rectified by a full-wave rectifier 40 (with a suitable voltage-dropping resistor 42) and filtered by means including capacitors 44 and 46 and resistor 48 to develop a direct voltage on conductor 50 which is negative with reference to the chassis ground. The circuit includes any suitable form of oscillator, such as the illustrated oscillator including transistor 52. The emitter of transistor 52 is connected to chassis ground through a parallel resistance-capacitance network 54, and the base is connected to power-supply conductor 50 via transformer winding 56 and resistor 58. The collector of transistor 52 is connected to the center tap of transformer winding 60 (which is coupled to winding 56), one end of which is connected to power supply conductor 50 via choke 62. The oscillatory frequency is illustratively controlled by controlling the magnitude of the capacitance which is connected across transformer winding 60. In the illustrated arrangement, that control is exercised by providing a plurality of alternatively effective capacitors such as capacitors 64, 66, 68 and 70 controlled, respectively, by normally-open, momentary switches 14a, 14b, 20a and 20b, controlled by actuators 14 and 20 in FIG. 1. The capacitance of the different capacitors should differ from one another and they may be made adjustable (or "trimmers" added) if desired for tuning. The oscillator may be quiescent when none of the switches 14a—20b is operated, or may be oscillating at a frequency to which no receiver unit is responsive.

The radiofrequency energy of the selected frequency is coupled to the wiring system via transformer winding 72, capacitor 74 and plug 24, capacitor 74 presenting a high impedance at line frequency but a low impedance at the signaling frequencies.

The transmitted radiofrequency energy on the line appears at each receiver, such as the receiver symbolically illustrated in FIG. 5, via the electrical wiring system as a whole and finally via that portion thereof constituting the two branch-circuit line or electrical-power conductors 74 and 76, it being assumed that conductor 74 and 76, it being assumed that conductor 74 is the "hot" or black coded conductor and that conductor 76 is the "ground" or white-coded conductor.

The line-frequency voltage on line 74—76 is rectified and filtered by power-supply unit 78 to develop a direct voltage between conductor 80 and chassis ground. The line-frequency voltage is effectively blocked from the frequency-sensitive circuit 82 and 84 by capacitors 86 and 88 which present a high impedance to the relatively low line frequency. Those frequency-sensitive circuits are preferably turned circuits, tuned to pass signals of the two different 94 high frequencies which are indicative of the one and the off signaling conditions, as selected by one of the transmitter switch pairs such as switches 14a and 14b. Thus, assuming circuit 82 to be tuned to the frequency at which the oscillatory circuit of the transmitter of FIG. 4 oscillates, when switch 14a is closed, those signals will be passed by tuned circuit 82, rectified by unidirectional current conducting device or diode 90, and applied to a low-pass filter or integrating network 92. The output direct voltage is applied to one signal input o4 of a bistable circuit 96. Correspondingly assuming circuit 84 to be tuned to the frequency at which the oscillatory circuit of the transmitter of FIG. 4 oscillates when switch 14b is closed (switch 14b being of the off element of switch 14 of FIG. 1), those signals will be rejected by tuned circuit 82 but will be passed by tuned circuit 84, rectified by diode 98, and filtered or integrated by network 100. The resulting direct voltage signal is applied, in the illustrated circuit, to a second signal input 102 of the bistable circuit 96.

In the circuit of FIG. 5, bistable circuit 102 is a device having two signal inputs 94 and 102, two stable states, and one signal output 104. A pulse of a selected polarity (here, illustratively, positive) applied to one input switches the device to one stable state, at which it will remain despite termination of that input pulse until a pulse (of the same polarity in the illustrated circuit) is applied to the other signal input, which will switch the bistable circuit to its second stable state, in which it will remain until a signal is again applied to the first input.

Bistable circuit 96 is supplied with direct voltage by a conductor 80, and a direct voltage signal (derived from that source) is applied to output conductor 104 which varies in accordance with the state of bistable circuit 96. Thus, in the assumed mode of operation, when circuit 96 is switched to one state, denominated its on state, by the application of a pulse to input 94, a positive direct voltage is applied to output conductor 104, and when circuit 96 is switched to its other stable state, denominated its off state, by the application of a pulse to input 102, the voltage on conductor 104 is reduced.

Preferably, bistable circuit 96 is a solid state unit comprising a pair of cross-coupled transistors, such circuits being well known and being variously characterized as bistable multivibrators, flip-flops, toggles, or other such terms.

Output conductor 104 is connected to a switching means comprising, in the illustrated arrangement, a silicon controlled rectifier (SCR) 106 and a rectifying bridge including unidirectional current conducting devices or diodes 108, 110, 112 and 114. The output signal on conductor 104 is applied to the gate of SCR 106, and when that signal is at a value indicative of the on state of bistable circuit 96, SCR 106 is enabled to energize the load. Conventional line current then flows from line conductor 74 (during the half cycle in which conductor 74 is positive relative to conductor 76), through diode 114, SCR 106, diode 110 and to load conductor 116, the other load conductor 76a being connected directly to line conductor 76. When conductor 76 is positive relative to conductor 74, conventional current flows from conductor 76, through the load, conductor 116, diode 108, SCR 106, diode 112 and to line conductor 74.

When bistable circuit 96 is switched to its off state, the enabling signal is removed from output conductor 104, SCR 106 does not conduct, and the load is effectively disconnected from the line.

In that manner, the load can be selectively energized from a remote location by momentarily actuating transmitter switch button or actuator 14 (FIG. 1) to its on condition, and can be deenergized by momentary actuation of actuator 14 to its off condition. The same results can, of course, be achieved by actuation of another such actuator at another remote location controlling a transmitter transmitting the same pair of pair of preselected frequencies.

It will be seen that since switch actuator 14 is a "momentary" switch, it will return to a neutral position on release so as to preclude false indications at the remote location of the condition of the load. If it is desired to control the load remotely, the actuator is appropriately actuated. If the load is already in that selected energized or deenergized state (which may well be unknown at the remote location), the received pulse will produce no change of state of the bistable circuit or of the load, but the operator will be satisfied that the remote circuit is in the state he desires.

It will also be appreciated that not only can a plurality of load devices be connected to the load conductors or terminals 76a and 116, but if desired a plurality of the receivers of FIGS. 2 and 5 can be tuned to the same preselected pair of frequencies so that all of the loads controlled thereby are controlled by the actuation of the transmitter actuator.

The load connected terminals 76a and 116 is also controllable locally as in conventional residential-type switching. In the system of FIGS. 2 and 5, actuator 28 is operable to an on condition, in which its contacts 28a are closed, or to an off condition in which its contacts 28b are closed. Release of manual pressure on actuator 28 results in restoration to neutral, with both contacts 28a and 28b being open.

Upon the momentary closure of contacts 28a, an input signal, in the form of the positive direct voltage on conductor 80, is applied to input 94 of bistable circuit 96. If the circuit is already in its "on" state, this will be without effect. If it is in its "off" state, the bistable circuit will be switched to its on condition just as it is in response to a signal from tuned circuit 82. Correspondingly, bistable circuit 96 can be switched to its off state by the momentary closure of contacts 28b.

Since the switching means, including SCR 106, is of a type of circuit often used in "dimming control" units (and other features of those circuits can be incorporated), a dimming feature can be readily added by the provision of a phase-shifting network to adjustably shift, under manual control, the firing angle or firing point of the SCR, that network including variable resistor 118 and capacitor 120 connected in series across the SCR, with the connection therebetween being connected to conductor 104 and hence to the SCR gate. The manually movable element of resistor 118 may appear as a separate knob on the switch plate 30 (FIG. 2) or switch actuator 28 may itself be made rotatable (or segregated into two actuators, one of which is rotatable), or otherwise.

When the unit of FIG. 2 is associated with the wall box, in substitution for or replacement of a wall switch, connections must be made, in the illustrated arrangement, to the two line conductors and to the two load conductors conventionally appearing in that box. The receiver is essentially a four-terminal device (74, 76, 76a and 116) and can be provided with four leads for connection to the line and load conductors, or can be provided with four wiring terminals such as those commonly used on switches. However, since one of the line conductors is connected to one of the load conductors (internally or externally of the receiver) three leads or terminals will suffice if desired.

The unit of FIG. 6 illustrates that a separate receiver unit can be provided with a circuit of the nature of that of FIG. 5 except that the SCR controls a receptacle 120, or a visual or audible signal 122 (or both), the latter being reflected in the label illustratively applied to switch actuator 18 in the transmitter unit of FIG. 1. Local switching of the outlet can, of course, be provided.

Figures 7, 8, 9, 11:
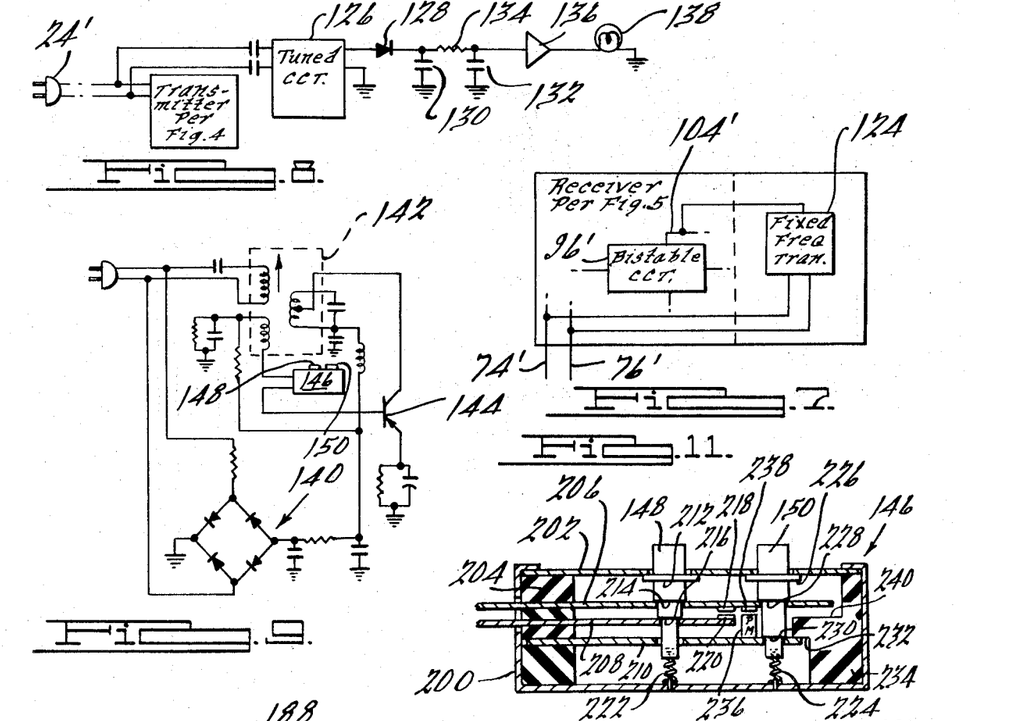
FIG. 7 is a schematic representation of the unit of FIG. 5 modified to include a pilot signalling feature.
FIG. 8 is a schematic representation of the unit of FIG. 4 modified to include a pilot signalling feature.
FIG. 9 is a schematic representation of a modified form of the unit of FIG. 4.
FIG. 11 is a diagrammatic view, in section, of a switch suitable for use in the unit of FIG. 9.

FIGS. 7 and 8 of the drawings illustrate one mode of providing a pilot-signal feature if desired. The receiver unit of FIG. 5 is supplemented (FIG. 7) by the addition of a keyable fixed frequency transmitter unit 124 (which should operate at a frequency different from any of the switching transmitter frequencies). The application of the on output signal condition to conductor 104' by bistable circuit 96' actuates the transmitter unit 124 to cause it to apply its preselected frequency signal to line 74'—76' and hence to the wiring system, as a result of which it appears at plug 24' of the transmitter unit (FIG. 8). In FIG. 8, the transmitter unit of FIG. 4 is supplemented by the addition of a local receiver unit including a tuned circuit 126 turned to pass signals of the frequency transmitted by transmitting unit 124. The passed signals are rectified by diode 128, representatively integrated by a low-pass filter including capacitors 130 and 132 and resistor 134, amplified, if desired, by amplifier 136, and applied to a suitable indicating device such as pilot light 138, so as remotely to indicate the condition of the controlled load. Deenergization of the load (locally or remotely) terminates the transmission by unit 124 and pilot lamp 138 is extinguished.

Figure 10:
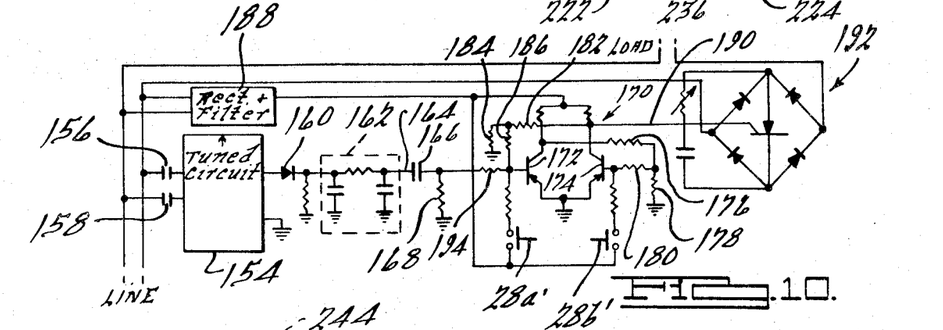
FIG. 10 is a schematic representation of a modified form of the unit of FIG. 5.

The circuit of FIGS. 9 and 10 illustrate the application of certain of the principles of the invention to a single-frequency signaling system. In the transmitter circuit of FIG. 9, the power supply 140, and the oscillator including transformer 142 and transistor 144, are similar to those previously described. The unit is provided with a control actuator 146 having an on actuator 148 and an off actuator 150. The control switch can be simply a toggle type single-pole, single-throw switch (as, a common wall switch), with actuation of actuator 148 closing the circuit (and holding it closed) to energize the transmitting oscillator, and with actuation of actuator 150 opening the circuit (and holding it open) to deenergize the transmitter so as to terminate the transmission. An alternative will be discussed hereinafter.

The receiving unit of FIG. 10 includes a tuned circuit 154 coupled to the line via capacitors 156 and 158 and tuned to pass signals of the frequency transmitted by the unit of FIG. 9. That signal is rectified by diode 160 and filtered, if desired, by integrator 162 to develop a direct voltage (assumed to be positive) on conductor 164. This voltage is applied to a differentiating circuit comprising capacitor 166 and resistor 168, with the voltage appearing across resistor 168 being applied to one signal input of a representative form of bistable circuit 170. That bistable circuit is illustrated as comprising a pair of grounded emitter, cross-coupled transistors 172 and 174, with the collector of transistor 172 being connected to the base of transistor 174 by means including resistors 176, 178 and 180, and with the collector of transistor 174 being connected to the base of transistor 172 by means including resistors 182, 184 and 186, with the two transistors being energized from a power supply 188. Other arrangements can be employed.

The output from the bistable circuit (taken at the collector of transistor 174) is applied via conductor 190 to a suitable controllable switching means 192, which may be of the same form previously discussed.

With no signal of the appropriate preselected frequency being recieved at the receiver of FIG. 10, capacitor 166 is discharged, and a voltage at approximately chassis ground level is applied to resistor 194 at the input of bistable circuit 170, a condition which does not affect the state of the bistable circuit. When the appropriate signal is received at the receiver unit, a positive direct voltage is applied to the left-hand terminal of capacitor 166 which, instantaneously, results in the application of a positive-going spike to the input of bistable circuit 170, triggering to its on stable state in which transistor 172 is conducting and transistor 174 is not. As a result, the collector of transistor 174 is at a voltage such that a gating signal is applied to actuate the switching means 192 to energize the load. The charge of capacitor 166 rapidly changes, with the voltage at the right-hand terminal thereof returning toward ground and with the positive voltage appearing at the left-hand terminal. This state continues (in the absence of local control) as long as the transmitter of FIG. 9 continues to transmit its signal. When that transmission terminates, the voltage at the left-hand terminal of capacitor 166 is reduced, producing, instantaneously, a negative-going voltage spike at the right-hand terminal which is applied to the input (the same input) of the bistable circuit 170 to switch that circuit to its off stable state in which transistor 174 is conductive and transistor 172 is not. This reduces the voltage on output conductor 190 below the gating level and the load is deenergized. The charge on capacitor 166 rapidly changes, with both terminals thereof approaching chassis ground level, in preparation for the next remote "on" signal.

Local switching can be accomplished in a manner similar to that previously described, by momentary actuation of the one switch 28a' or of the off switch 28b'.

To permit full independency of the local and remote switching functions, it is advantageous to utilize switching means of the character of that illustrated in FIG. 11 in the transmitter circuit of FIG. 9. Thus with a simple on/off switch, as described above, if transmission exists and the receiver unit is thereafter turned off locally, actuation of the on switch at the transmitter will not necessarily energize the load (with the receiver circuitry illustratively disclosed), and a correlative condition exists in the off condition of the unit. Improved operation can be obtained, for example, by employing a switch at the transmitter which insures that the contacts are open (to terminate transmission) upon momentary actuation of the on actuator 148, and which closes the contacts (to institute or reinstitute transmission) upon release, and which, upon actuation of the off actuator, closes the contacts to insure transmission and, upon release, opens the contacts to terminate transmission.

In the representative form of such a switch illustrated in FIG. 11, an elongated housing 200, having a face plate 202, carries at one end an insulating stack 204 supporting a plurality of overlying cantilever springs 206, 208 and 210 of which spring 210 is desirably stiffer than the others. Manually actuatable actuator 148 (which may be deemed the on button) is an elongated, stepped member of insulating material which projects through an aperture in plate 202 and is provided with a stop collar 212 engageable with the undersurface of the apertured face e plate 202 to limit outward movement of actuator 148. Actuator 148 passes through aligned apertures in springs 206 and 208 and has shoulders 214 and 216 concurrently engaging the outer surfaces of springs 206 and 208, respectively, when contacts 218 and 220, carried by springs 206 and 208, respectively, a are in their disengaged positions, as shown. Actuator 148 passes freely through an aperture in spring 210 and engages a compression spring 222 which biases it outwardly (upwardly, in the illustration).

Correspondingly, manually actuatable actuator 150 is a member of insulating material biased by a spring 224 to a position in which collar 226 thereon abuts the undersurface of face plate 202. Actuator 150 extends through springs 206 and 210 and has shoulders 228 and 230 concurrently engageable with the upper surfaces of springs 206 and 210, respectively, in the illustrated released position of the switch, but spring 208 terminates short of engagement with actuator 150.

Spring 210 is pretensioned so as to resiliently engage a shoulder 232 on an insulator 234 retained in housing 200. A permanent magnet 236 is carried by spring 210 in a position to cooperate with an armature 238 carried by spring 206, but in the released position of the unit, magnet 236 is spaced from that armature and the attractive force is insufficient to overcome the upward bias of spring 206.

Downward movement (in the view of FIG. 11) of contacts spring 206 is limited by the engagement thereof with shoulder 240 on insulator 234.

In the released position of the switch assembly, as shown, contacts 218 and 220 are separated. Upon the momentary depression of the on actuator 148, spring 206 is flexed downwardly by shoulder 214 to move armature 238 into latching engagement with permanent magnet 236. However, springs 206 and 208 are concurrently moved downwardly by actuator 148 so that the contacts 218 and 220 are not brought into mating engagement. Actuator 148 may be moved sufficiently to cause the forces exerted through armature 218 and permanent magnet 236 to move spring 210 away from stop shoulder 232.

When the actuating force on actuator 148 is released, upward movement of spring 210, if any, is terminated by the engagement thereof with shoulder 232. The latching engagement of permanent magnet 236 with armature 238 precludes further upward movement of spring 206, but spring 208 continues to move upwards, with actuator 148, in the direction of its pretension, until contact 220 mates with contact 218. The contacts are thus closed, initiating transmission.

If thereafter actuator 150 is depressed, it will not directly move spring 206 since that spring is now spaced form shoulder 228, but it will force spring 210 downwardly. Spring 206 may move downwardly therewith due to the latching engagement, but when spring 206 engages stop shoulder 240 further movement thereof is prevented and additional downward movement of actuator 150 will separate permanent magnet 236 from armature 238 to release the latching engagement. When actuator 150 is thereafter released, spring 206 will move upwardly therewith, separating contacts 218 and 220, thereby terminating transmission.

If, with the contacts open, actuator 150 is depressed (to turn off, remotely, a load which has in the interim been turned on locally), springs 206 and 210 will both be moved downwardly in fixed-space relation. Contact 218 will thereby be moved into engagement with contact 220. Further downward movement of actuator 150 will flex spring 208.

Upon the subsequent release of actuator 150, all three springs will move upwardly until spring 210 engages stop shoulder 232. Since latching engagement was not established between permanent magnet 236 and armature 238, continued upward movement of actuator 150 will result in continued upward flexing of spring 206. Spring 208 will stop upon engagement with shoulder 214, and the contacts 218 and 220 will be separated. Thus, the contacts are momentarily closed upon depression of actuator 150 and opened upon release thereof.

If, with the contacts closed (and transmission occurring), actuator 148 is depressed (to turn on, remotely, a load which has in the interim been turned off locally), spring 208 is moved downwardly, but spring 206 is not in engagement with shoulder 214 since it is latched in its downward position. Contacts 218 and 220 are thereby opened. Those contacts will remain separated during any overtravel of actuator 148 but spring 206 will remain latched to spring 210. Upon the subsequent release of actuator 148, spring 208 flexes upwardly therewith to reclose contacts 218 and 220. Thus the contacts have been momentarily opened, and reclosed.

Since the time required for capacitor 166 in the receiver of FIG. 10 to effectively change charge (charge or discharge) is small relative to the "momentary" operating times of actuators 148 and 150, this sequence of switch (and transmitter) operations will enable the receiver fully and properly to respond to the commands of the transmitter, independently of what changes of state of the dual-state device 170 have a occurred as a result of local switching by switches 28a' and 28b'.

It will be appreciated that latching means other than a permanent magnet can be employed and that a single pivoted actuator can be utilized if desired.

The tuning of the receiver-transmitter combinations of each embodiment can be accomplished at the factory, at a distribution point, or during installation. The correlation of the tuning can be accomplished by tuning the transmitter or by tuning the receiver, or both. Desirably, each of a plurality of the tramsmitter units of FIG. 4 or FIG. 9 should be tunable to a common receiver frequency (or pair of frequencies) to accommodate remote control from a plurality of different remote locations of a single load (or loads), and desirably each of a plurality of the receiver units of FIG. 5 or FIG. 10 should be tunable to a common transmitter frequency (or pair of frequencies) to accommodate remote control of a plurality of different loads, controlled by different receivers, upon actuation of a single transmitter actuator.

Figure 12:
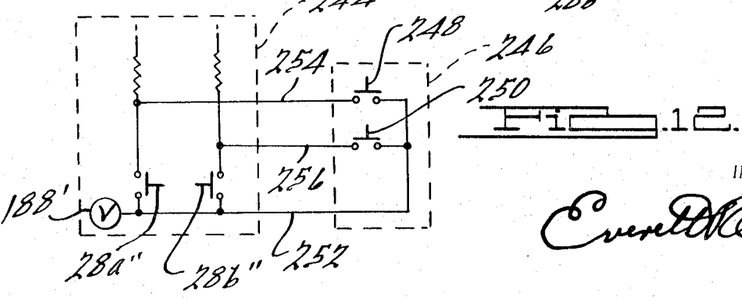
FIG. 12 is a schematic representation of a modification of the unit of FIG. 5 or FIG. 10 to include additional local switches.

The receiver unit of, for example, FIG. 2 can be, as noted, associated with a wall box in replacement of or substitution for a conventional single-pole single-throw wall switch. In some cases, however, two local switches are provided to control, individually, a common load as, for example, switches at each of two entrances to a room each controlling single ceiling light fixture. In that case, each switch is usually a "three-way" switch, that is, a single-pole double-throw switch, with a three-conductor cable extending between the two switch boxes. Corresponding switching, with additional remote control, can be achieved with the subject system. A receiver unit (represented by rectangle 244 in FIG. 12) is associated with one of the switch boxes. It may be either of the type of FIG. 5 or FIG. 10, or equivalent. The local on momentary switch 28a''(counterpart of switch 38a or 38a') and the local off momentary switch 28b'' (counterpart of switch 28b or 28b') in that local receiver unit controls the local switching of the state of the receiver's dual state device by selectively connecting a voltage (as from source 188') to the respective signal inputs thereof, as before described. A simple momentary switch corresponding to those described herein for use in the transmitter of FIG. 4 or the receivers of FIGS. 5 or 10 is used at the second local wall box 246. It includes a momentary on switch 248 and a momentary off switch 250 which are alternatively actuable by a manually actuatable actuator. Conductor 252, which is one of the existing (in existing construction) or normal (in new construction) conductors of the three-wire cable extending between the wall boxes, is connected to voltage source 188' (and hence to one contact of each of the switches 28a'' and 28b'') and to one contact of each of the switches 248 an 250. The remaining contacts of switches 248 and 28a'' are interconnected by conductor 254 of the three-wire cable, and the remaining wire, conductor 256, interconnects the remaining contacts of switches 250 and 28b''. Thus, switches 248 and 250 are connected in parallel, respectively, with switches 28'' and 28''. Additional local actuators corresponding to the actuator in wall box 246 can be installed by similarly connecting the corresponding switches thereof in parallel with switches 248 and 250, respectively.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

I claim:

1. In a remote control system for use in association with a conventional residential-type electrical wiring system having effectively electrically interconnected conventional electric wiring branch circuits extending and delivering electric power to various portions of the building, with at least some of those branch circuits delivering power to lighting or the like loads connectable for control by local switches mountable in local wall boxes, with a pair of branch circuit conductors entering the box and a pair of load conductors extending from the box, the combination of a receiver unit mountable in the wall box and connectable to the pair of branch circuit conductors entering said box and to the pair of load circuit conductors extending from the wall box, said receiver including control means including frequency-sensitive circuit means responsive to signals on the branch circuit conductors indicative of "on" and "off" conditions for producing signal pulses, dual state means having two stable states and controlled by said frequency-sensitive circuit means for switching between said two stable states in response to said pulses, and switching means controlled by said dual state means for controlling the connection of said branch circuit conductors to said load circuit conductors.

2. The combination of claim 1 in which said receiver includes a container physically accepted by the wall box, three terminal means one of which is connectable to one of the pair of branch circuit conductors, one of which is connectable to one of the load circuit conductors and the third one of which is connectable both to the other one of said branch circuit conductors the other one of said load circuit conductors, a manually actuatable switch physically supported by said container, and a switch plate.

3. The combination of claim 2 in which said third terminal means includes two interconnected terminal portions connectable respectively to said other one of said branch circuit conductors and said other one of said load circuit conductors.

4. The combination of claim 1 further including local manually operable switching means located at the wall box for independently selectively switching the state of said dual state means.

5. The combination of claim 4 in which said switching means includes a silicon controlled rectifier, and means for varying the firing point of said silicon controlled rectifier including manually adjustable means.

6. The combination of claim 4, in which said frequency-sensitive circuit means includes means responsive to one change of condition of the signals on the branch circuit conductors for signaling said dual-state means to switch from one state to another state and responsive to another change of condition of the signals on the branch circuit conductors for signaling said dual-state means to switch from said other state to said one state.

7. The combination of claim 6 further including transmitter means for selectively applying to the branch circuit conductors in the wiring system signals of first and second preselected frequencies and in which said one change of condition of the signals on the branch circuit conductors is a change to the existence thereon of a signal of a first preselected frequency and in which said another change of condition of the signals on the branch circuit conductors is a change to the existence thereon of a signal of a second preselected frequency differing from said first preselected frequency.

8. The combination of claim 6 further including transmitter means for selectively instituting and terminating the application to the branch circuit conductors in the wiring system a signal of a preselected frequency and in which said one change of condition of the signals on the branch circuit conductors is a change to the existence thereon of a signal of a preselected frequency and which in said another change of condition of the signals on the branch circuit conductors is a change to the cessation thereon of a signal of a preselected frequency.

9. The combination of claim 6 further including transmitter means disposed at a point remote from the wall box and connected to the wiring system for applying signals to the branch circuit conductors in the wiring system indicative of "on" and "off" conditions.

10. The combination of claim 9 in which said signal indicative of an "on" condition is a signal of a first preselected frequency and in which said signal indicative of an "off" condition is a signal of a second preselected frequency.

11. The combination of claim 9 in which said signal indicative of an "on" condition is a signal of a preselected frequency and in which said signal indicative of an "off" condition is the cessation of said signal of said preselected frequency.

12. The combination of claim 10 in which said dual-state means is effective if it is in said another state to switch to said one state in response to said another change of condition of the signals on the branch circuit conductors.

13. The combination of claim 11 in which said dual-state means is effective if it is in said one state to switch to said another state in response to said one change of condition of the signals on the branch circuit conductors, and in which said dual-state means is effective if it is in said another state to switch to said one state in response to said another change of condition of the signals on the branch circuit conductors.

14. The combination of claim 6 in which said dual-state means is a solid state unit including two cross coupled transistors, said unit having two inputs and changing from one state to another in response to a signal at one of said inputs and changing from said another state to said one state in response to a signal at the other one of said inputs, and remaining in either state until a signal switching it to a different state is received, and in which said switching means includes a silicon controlled rectifier the gate of which is controlled by said dual-state means.

15. The combination of claim 6 in which said dual-state means is a solid state device having signal input means and signal output means, with the state of said dual-state means being shifted in response to signals applied to said signal input means and with said dual-state means transmitting an output signal via said signal output means indicative of its instant state, and in which means including said frequency-sensitive circuit means applies said signals to said input means.

16. The combination of claim 15 in which said local manually operable switching means also controls the application of signals to said signal input means.

17. The combination of claim 15 in which said dual-state means has two separate signal inputs and in which said local manually operable switching means includes separately operable "on" and "off" switching means with one thereof connected to one of said signal inputs and with the other thereof connected to the other one of said signal inputs.

18. The combination of claim 17 in which said means including said frequency-sensitive circuit means applies said signals to but one of said inputs.

19. The combination of claim 17 in which said means including said frequency-sensitive circuit means applies said signals to one of said two separate signal inputs in response to the receipt of a signal indicative of an "on" condition and to the other one of said two separate signal inputs in response to the receipt of a signal indicative of an "off" condition.

20. The combination of claim 15 in which said switching means controlled by said dual-state means includes a controllable solid state device responsive to said output signal.

21. The combination of claim 20 in which said switching means includes a silicon controlled rectifier and unidirectional current conducting means.

22. The combination of claim 20 further including manually adjustable phase shifting means connected to said controllable solid state device for controlling the firing angle of said solid state device.

23. The combination of claim 15 in which one change of condition of the signals on the branch circuit means is a change to a signal of one frequency indicative of an "on" condition and in which said another change of condition of the signals on the branch circuit means is a change to a signal of a second different frequency indicative of an "off" condition, and in which said frequency-sensitive circuit means comprises one tuned circuit tuned to pass signals of said one frequency and a second tuned circuit tuned to pass signals of said second frequency.

24. The combination of claim 23 in which signals passed by said tuned circuits are individually rectified and integrated.

25. The combination of claim 24 in which said dual-state means has two separate signal inputs, in which one of said individually rectified and integrated signals is applied to one of said signal inputs, and in which the other one of said individually rectified and integrated signals is applied to the other one of said signal inputs.

26. The combination of claim 25 in which said local manually operable switching means includes separately operable "on" and "off" switching means with one thereof connected to one of said signal inputs and with the other thereof connected to the other one of said signal inputs.

27. The combination of claim 15 in which one change of condition of the signals on said branch circuit means is the institution of a signal of a preselected frequency and in which another change of condition of the signals on said branch circuit means is a cessation of said signal of said preselected frequency, and in which said frequency-sensitive circuit means includes a tuned circuit tuned to pass signals of said preselected frequency.

28. The combination of a claim 27 in which the signals passed by said tuned circuit are rectified and differentiated and applied to said dual-state means.

29. The combination of claim 27 in which the signals passed by said tuned circuit are rectified, integrated and differentiated and applied to a single input of said dual-state means.

30. The combination of claim 15 further including transmitter means coupled to the electrical wiring system at a location remote from said receiver unit and including first and second momentarily operable switches and oscillator means responsive to the momentary actuation of one of said switches to momentarily apply a signal of one frequency indicative of an "on" condition to the electrical wiring system and responsive to the momentary actuation of the other one of said switches to momentarily apply a signal of a second different frequency indicative of an "off" condition to the electrical wiring system.

31. The combination of claim 15 further including transmitter means coupled to the electrical wiring system at a location remote from said receiver unit and including manually operable switch means having two conditions and oscillator means responsive to the operation of said switch means to one of said conditions to apply a signal of a preselected frequency to the electrical wiring system and responsive to the operation of said switch means to the other one of said conditions to terminate the application of said signal to the electrical wiring system.

32. The combination of claim 15 further including a transmitting means coupled to the electrical wiring system at a location remote from said receiver unit and including first and second momentarily manually actuatable actuators, and oscillator means controlled by said actuators for selectively applying a signal of a preselected frequency to the electrical wiring system and effective in response to the momentary actuation of one of said actuators for first insuring that no signal is transmitted and for then transmitting said signal and effective in response to the momentary actuation of the other one of said actuators for first insuring that said signal is transmitted and for then terminating transmission of said signal.

33. The combination of claim 32 in which transmitting means includes a pair of conductors controlling said signal transmission and a pair of cooperating electrical contacts having open and closed conditions and connectable to respective ones of said pair of electrical conductors, means effective in response to momentary actuation and release of said d first actuator for first insuring that said contacts are open and then closing said contacts and holding said contacts closed, and means effective in response to momentary actuation and release of said second actuator for first insuring ta that said contacts are closed and then opening said contacts and holding said contacts open.

34. The combination of claim 32 in which one change of condition of the signals on the branch circuit means is the institution of a signal of a preselected frequency and in which another change of condition of the signals on the branch circuit means is a cessation of said signal of said preselected frequency, and in which said frequency-sensitive circuit means includes a tuned circuit tuned to pass signals of said preselected frequency.

35. The combination of claim 1 further including transmitter means disposed at a point remote from the wall box and connected to the wiring system for applying signals to the branch circuit conductors in the wiring system indicative of "on" and "off" conditions.

36. The combination of claim 35 further including transmitting means disposed at said receiver unit for applying a signal to said wiring system indicative of the condition of said switching means, and receiver means at said transmitter means responsive to said signal from said transmitting means for producing a visual indication of said condition of said switching means.

37. The combination of claim 35 further including local manually operable switching means at wall box for selectively switching the state of said dual state means.

38. In a remote control system for use in association with a conventional residential-type electrical wiring system having pairs of electric-power conductors extending to various portions of the building with at least one of the pairs of electric-power conductors being switchably connectable to a lighting load or the like for selectively delivering electrical power to that load, the remote control system including transmitter means connectable to the wiring system remote from the load and having remote selectively manually actuatable "on" and "off" actuating means for selectively establishing in the wiring system and hence in the one pair of electric-power conductors signal conditions indicative of "on" and "off" conditions; a receiver unit connectable to the one pair of electric-power conductors and to the load, and comprising local selectively manually actuatable "on" and "off" actuating means, and means including switching means independently controlled by said local "on" and "off" actuating means and by said signals on the one pair of electric-power conductors for switchably connecting and disconnecting the one pair of electric-power conductors to and from the load and effective when the load is disconnected to connect the load in response to signal conditions indicative of an "on" condition and to connect the load in response to an "on" actuation of said local "on" and "off" actuating means, and effective when the load is connected to disconnect the load in response to signal conditions indicative of an "off" condition and to disconnect the load in response to an "off" actuation of said local "on" and "off" actuating means.

39. The combination of claim 38 in which each of said remote and local "on" and "off" actuating means includes two manually movable portions labeled "on" and "off," respectively, and in which each of said remote and local "on" and "off" actuating means is selectively actuatable to an "on" condition or to an "off" condition, in which each actuation of said remote "on" and "off" actuating means to an "on" condition results in energization of the load unless the the load is already energized, independently of said local "on" and "off" actuating means, in which each actuating of said remote "on" and "off" actuating means to an off condition results in deenergization of the load, unless the load is already deenergized, independently of said local "on" and "off" actuating means, in which each actuation of said local "on" and "off" actuating means to an "on" condition results in energization of the load, unless the load is already energized, independently of said remote "on" and "off" actuating means, and in which actuation of said local "on" and "off" actuating means to an "off" condition results in deenergization of the load, unless the load is already deenergized, independently of said remote "on" and "off" actuating means.

40. The combination of claim 39 in which said receiver means is physically disposed in a wall box adjacent the area having the load and is connectable to the one pair of powered electric-power controls and is connectable to electric-power conductors extending to the load and selectively and switchably interconnects one of each pair to one of the other pair.

41. The combination of claim 39 in which each of said portions controls a momentary switch.

42. The combination of s claim 38 in which said signals are of a frequency which is high relative to the frequency of the electric-power source connected to the wiring system.